(12) United States Patent
Ragan et al.

(10) Patent No.: US 11,724,884 B2
(45) Date of Patent: Aug. 15, 2023

(54) MODULAR SLAT CONVEYOR BELT

(71) Applicant: Laitram, L.L.C., Harahan, LA (US)

(72) Inventors: Bryant G. Ragan, Metairie, LA (US); David W. Bogle, Round Rock, TX (US); John de St. Germain, Ponchatoula, LA (US)

(73) Assignee: Laitram, L.L.C., Harahan, LA (US)

( * ) Notice: Subject to any disclaimer, the term of this patent is extended or adjusted under 35 U.S.C. 154(b) by 8 days.

(21) Appl. No.: 17/612,260

(22) PCT Filed: May 27, 2020

(86) PCT No.: PCT/US2020/034634
§ 371 (c)(1),
(2) Date: Nov. 18, 2021

(87) PCT Pub. No.: WO2020/243131
PCT Pub. Date: Dec. 3, 2020

(65) Prior Publication Data
US 2022/0194712 A1   Jun. 23, 2022

Related U.S. Application Data

(60) Provisional application No. 62/853,864, filed on May 29, 2019.

(51) Int. Cl.
*B65G 17/06* (2006.01)
*B65G 17/30* (2006.01)
(Continued)

(52) U.S. Cl.
CPC ........... *B65G 17/067* (2013.01); *B65G 17/30* (2013.01); *B65G 21/08* (2013.01); *B65G 21/20* (2013.01);
(Continued)

(58) Field of Classification Search
CPC ...... B65G 17/067; B65G 17/30; B65G 21/08; B65G 21/20; B65G 23/04; B65G 2207/48;
(Continued)

(56) References Cited

U.S. PATENT DOCUMENTS

| 3,174,618 A | 3/1965 | Wesson |
| 3,732,970 A | 5/1973 | Nakanishi et al. |
| 4,167,999 A * | 9/1979 | Haggerty ............... B65G 17/44 198/803.2 |
| 4,526,271 A * | 7/1985 | Finnighan ............ B65G 17/067 198/803.2 |

(Continued)

FOREIGN PATENT DOCUMENTS

| JP | 2018034922 A | 3/2018 |
| KR | 101485092 B1 | 1/2015 |

OTHER PUBLICATIONS

Extended European Search Report, European Patent Application No. 20813558.2, dated May 8, 2023, European Patent Office, Munich, Germany.

*Primary Examiner* — Mark A Deuble
(74) *Attorney, Agent, or Firm* — Catherine M. Bishop

(57) ABSTRACT

A slat conveyor belt includes connected drive modules that can be easily disassembled and assembled. Each drive module comprises a slat portion connected to a drive portion forming a drive chain. A conveyor frame for the conveyor belt includes a dust cover for the drive chain and a separator for selectively separating a slat portion from an associated drive portion. A magazine automatically removes and stores separated slats.

22 Claims, 14 Drawing Sheets

(51) Int. Cl.
*B65G 21/08* (2006.01)
*B65G 21/20* (2006.01)
*B65G 23/04* (2006.01)
*B65G 21/22* (2006.01)
*B65G 23/06* (2006.01)

(52) U.S. Cl.
CPC ............. *B65G 21/22* (2013.01); *B65G 23/04* (2013.01); *B65G 23/06* (2013.01); *B65G 2207/48* (2013.01)

(58) Field of Classification Search
CPC ........ B65G 17/00; B65G 45/10; B65G 17/42; B65G 2207/26; B65G 17/068; B65G 17/44; B65G 21/22; B65G 23/06
See application file for complete search history.

(56) References Cited

U.S. PATENT DOCUMENTS

| | | | |
|---|---|---|---|
| 4,930,623 A | 6/1990 | Johnson et al. | |
| 5,878,869 A | 3/1999 | Wang | |
| 6,607,064 B2 * | 8/2003 | Inoue | B66B 23/12 198/324 |
| 7,428,964 B2 | 9/2008 | Yoshida | |
| 9,809,387 B2 * | 11/2017 | Hsieh | A47J 37/1271 |
| 10,220,249 B1 * | 3/2019 | Chuang | A63B 22/0285 |
| 2011/0061997 A1 | 3/2011 | Layne et al. | |
| 2012/0018281 A1 * | 1/2012 | McCormick | B65G 17/068 198/853 |
| 2012/0024676 A1 | 2/2012 | McCormick et al. | |
| 2019/0119042 A1 * | 4/2019 | Adomaitis | B65G 17/063 |
| 2020/0391952 A1 | 12/2020 | Kringstad | |

* cited by examiner

MODULAR SLAT CONVEYOR BELT

RELATED APPLICATIONS

This application claims priority to U.S. Provisional Patent Application Ser. No. 62/853,864 filed May 29, 2019 and entitled "Modular Slat Conveyor Belt", the contents of which are herein incorporated by reference.

BACKGROUND OF THE INVENTION

The invention relates generally to power-driven conveyors and more particularly to modular conveyor belts.

Conveyor belts are widely used in various industries to convey products. Modular conveyor belts are generally constructed of a series of rows of connected belt modules, which can be formed of injection molded plastic, metal or another suitable material. Slat conveyors generally comprise a series of discretely-spaced, planar slats forming a conveying surface. The slats are attached at each side to an endless chain for driving the slats. Often, bolts, screws and—or other dirt-trapping connectors are used to attach the slat to the endless chain, creating problems with hygiene, as well as complicating assembly and disassembly of the conveyor belt.

SUMMARY OF THE INVENTION

A slat conveyor belt is constructed of a series of connected modules, each module comprising a product-supporting slat and two side drive chains. A drive module receives a connecting portion of an associated slat to couple the slat to the drive module. The slat conveyor belt can be easily disassembled and assembled. A frame for the slat conveyor belt includes a separator for selectively separating a slat from an associate drive module to allow access, assembly, removal or cleaning. A magazine may automatically remove and store separated slats.

According to one aspect, a conveyor belt module comprises a slat and a drive module coupled to the slat. The slat comprises a body having a top conveying surface extending from a front edge to a rear edge, and from a first side to a second side, the slat further comprising a connecting tab extending from the first side. The drive module drives the slat through an endless loop and comprises a body, an opening in the side of the body for receiving the connecting tab and a drive element for driving the module through an endless loop.

According to another aspect, a conveyor comprises a frame and a slat conveyor belt supported in the frame. The slat conveyor belt comprises a series of rows of slats coupled to drive modules, each slat including a connecting tab received in a side opening in an associated drive module.

According to another aspect, a conveyor frame for a slat conveyor belt comprises a track extending from an infeed end to an outfeed end adjacent a carryway, the track including a curved outer wall in a separating portion, a wear strip for a drive chain on a bottom wall of the track, a curved side wear strip along the separating portion of the track, a pusher adjacent an inner wall of the track in the separating portion and an actuator for pushing a drive module out of engagement with a slat of the slat conveyor belt.

BRIEF DESCRIPTION OF THE DRAWINGS

These features and aspects of the invention, as well as its advantages, are better understood by referring to the following description, appended claims, and accompanying drawings, in which:

DETAILED DESCRIPTION OF THE INVENTION

A slat conveyor system capable of easily separating drive modules from conveying slats for cleaning, replacement or disassembly. Embodiments of the invention will be described below relative to certain illustrative embodiments, though the invention is not limited to those embodiments.

Figure 1:
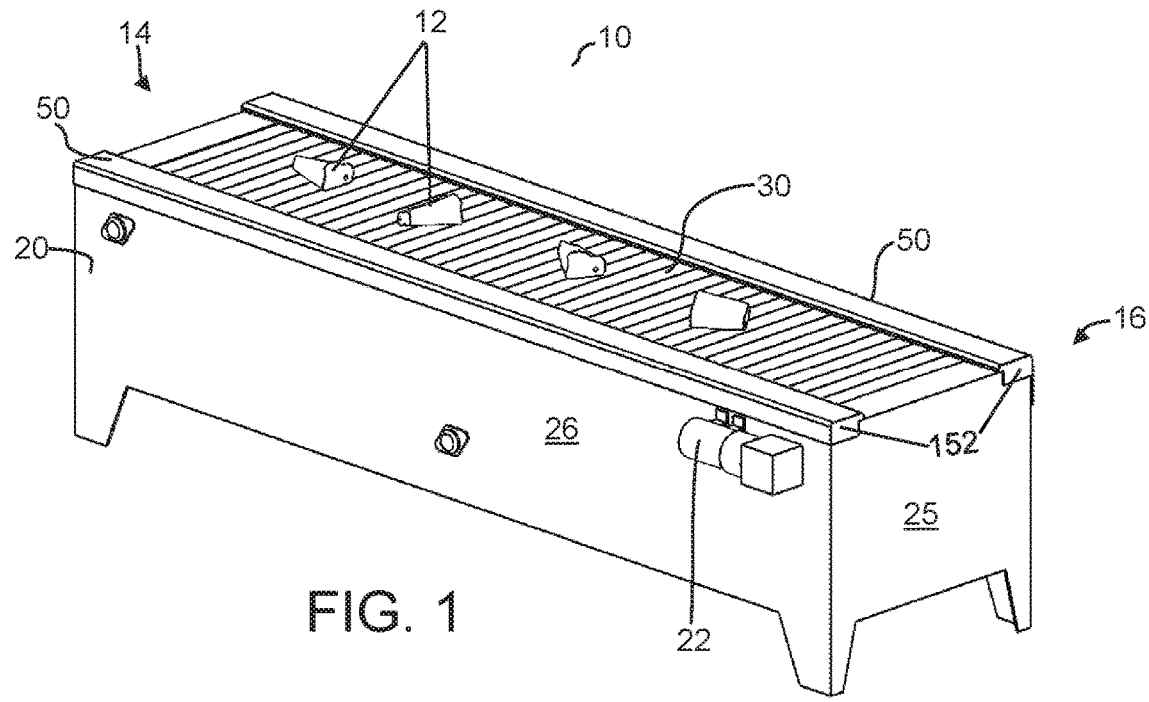
FIG. 1 is an isometric view of a conveyor comprising a slat conveyor belt that can be easily assembled and disassembled according to an embodiment of the invention.
Figure 2:
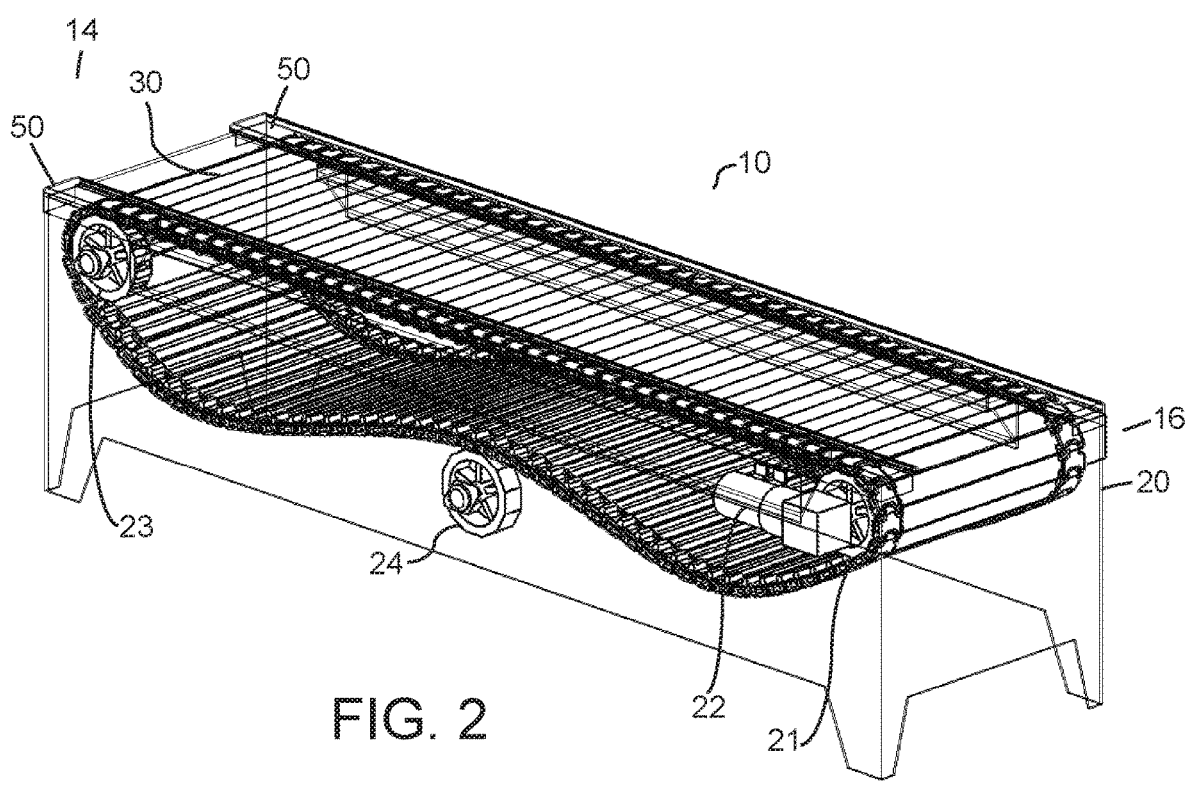
FIG. 2 is an isometric view of the conveyor of FIG. 1 with the frame of the conveyor transparent to show the interior of the conveyor.

FIGS. 1 and 2 shows a conveyor 10 for conveying product 12 from an infeed end 14 to an outfeed end 16. The conveyor comprises a frame 20 supporting a slat conveyor belt 30 according to an embodiment of the invention. The slat conveyor belt 30 comprises a series of conveyor belt modules connected together to form an endless loop. The slat conveyor belt forms a carryway with a conveying surface for the product 12. The conveyor belt 30 is trained around belt guides, shown as a drive sprocket 21 driven by a motor 22, an idle sprocket 23 and a returnway roller 24 and returns in a returnway below the carryway. The illustrative conveyor 10 comprises a pair of synchronized motors, one on each side of the conveyor belt, each driving an associated drive sprocket 21, as described and shown below.

The illustrative conveyor 10 further includes dust covers 50 extending along the length of the carryway from the infeed end 14 to the outfeed end 16 on each side of the carryway.

Figure 3:
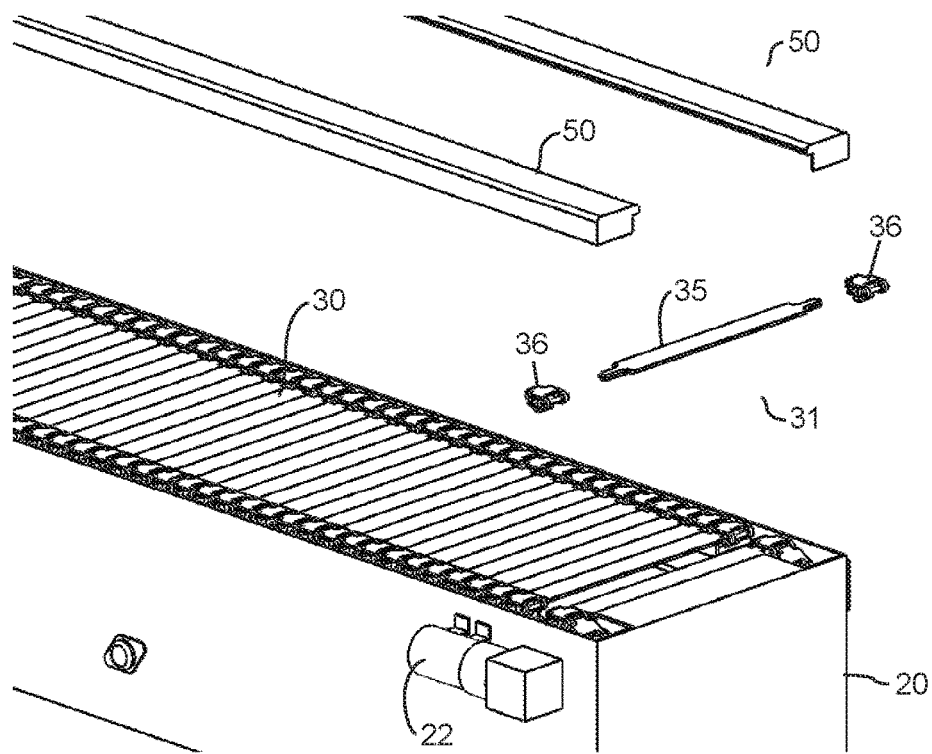
FIG. 3 is an exploded view of an outfeed portion of the conveyor of FIG. 1.

The conveyor belt 30 comprises a series of conveyor belt modules 31 connected together to form an endless loop. Each conveyor belt module, as shown in FIG. 3, comprises a slat portion 35 forming the product conveying surface and a drive portion 36 connected to each slat portion for moving each slat portion through the endless loop. In the illustrative embodiment, each module 31 comprises a drive chain module 36 connected to each side of the slat portion 35 to form the drive portion.

Figure 4:
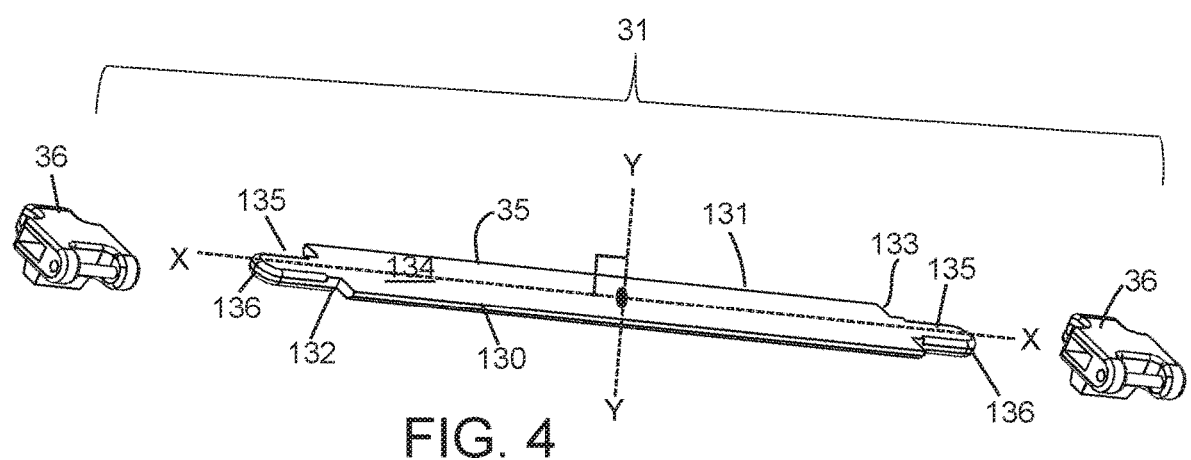
FIG. 4 is an exploded view of a module of the slat conveyor belt of FIG. 3.

Referring to FIG. 4, each illustrative slat portion 35 comprises a substantially planar main body extending in length from a front edge 130 to a rear edge 131, in width from a first side 132 to a second side 133 and in thickness from an upper conveying surface 134 to an opposite bottom surface. The illustrative main body is solid and planar, but can alternatively include openings, or have other features suitable for conveying an intended product. The illustrative conveying surface 134 prevents or inhibits dirt and bacteria harborage to enhance sanitation.

Connecting tabs 135 extend from each side of the main body for connecting the slat portion 35 to the drive chain modules 36. The illustrative connecting tabs 135 are coplanar with the main body, though the invention is not so limited. Each connecting tab 135 protrudes laterally out from either the first side 132 or the second side 133 and includes a rounded outer edge 136.

In one embodiment, the slat portion 35 is reversible about both an X axis and a Y axis. The slat portion 35 has the same orientation and shape when flipped (i.e., rotated 180° about either axis) to facilitate manufacture, as well as assembly and—or disassembly of the conveyor belt 30.

Figure 5:
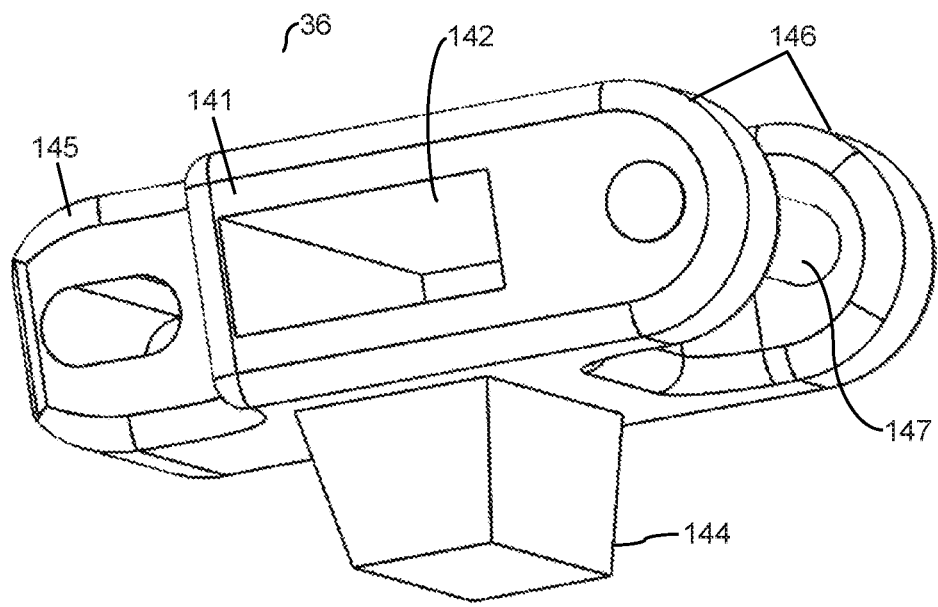
FIG. 5 is an isometric view of a drive module of the slat conveyor belt module of FIG. 4.

Referring to FIG. 5, each drive module 36 comprises a body 141 having a side recess 142 for receiving an associated connecting tab 135. The connecting tab 135 can be inserted into the side recess to connect the slat portion 35 to the drive module without tools or connectors, such as screws or bolts, that can harbor bacteria and dirt.

The illustrative recess 142 is size for a fit that constrains vertical and lateral movement of the associated connecting tab, yet allows for easy removal by pulling the connecting tab out of the recess. The recess 142 could be a blind hole or a through-hole. The invention is not limited to the illustrative embodiment, and the recess can have any suitable size, shape and configuration.

The invention is not limited to the illustrative connecting means. For example, the connecting tab 135 can have any suitable size, shape or configuration, and the side recess 142 can have any suitable complementary size, shape and configuration for mating with the connecting tab. For example, the connecting tab 135 could have a round, semi-round, triangular, square or other-shaped cross-section, with the corresponding side recess 142 shaped to receive the connecting tab. The connecting tab 135 is not limited to being coplanar to the main body of the slat, and can be offset from the main body.

The drive module 36 further includes a drive tooth 144 extending from the bottom of the body 141. The drive tooth 144 engages with a drive pocket in the sprocket 21 to drive the conveyor belt 30. Other means for driving the conveyor belt can be used. For example, the drive module 36 may include a drive pocket that engages a drive tooth on the sprocket 21. Other suitable driving means include, but are not limited to, friction drive, magnetic drive and others known in the art. The illustrative drive tooth 144 tapers in length from the top to bottom, but the invention took is not so limited. The illustrative drive tooth 144 has a depth that is approximately the same as the thickness of the drive module, a little less than the width of the drive module in width and about one-fourth of the length of the drive module in length, but the invention is not so limited.

The drive module 36 further includes module connectors extending from the front and rear of the body 141 for connecting the drive module 36 to front and rear modules in the resulting chain defining the endless loop. In the illustrative embodiment, the connectors comprise a pair of spaced apart hinge elements 146 extending from a front end of the body 141 and a rear hinge element 145 extending from the rear end of the body 141 and configured to be received between spaced apart hinge elements on an adjacent drive module. A hinge rod 147 connects adjacent modules together. The opening in the illustrative rear hinge element 145 may be slotted to selectively allow lateral shifting of the drive modules relative to each other, as described below. Other suitable means for connecting the drive modules 36 together to form an endless loop can be used, and the invention is not limited to the illustrative hinge elements.

In one embodiment, the slat portion 35 is formed of metal, such as stainless steel, and the drive modules 36 are formed of injection-molded plastic, though the invention is not so limited.

Figure 6:
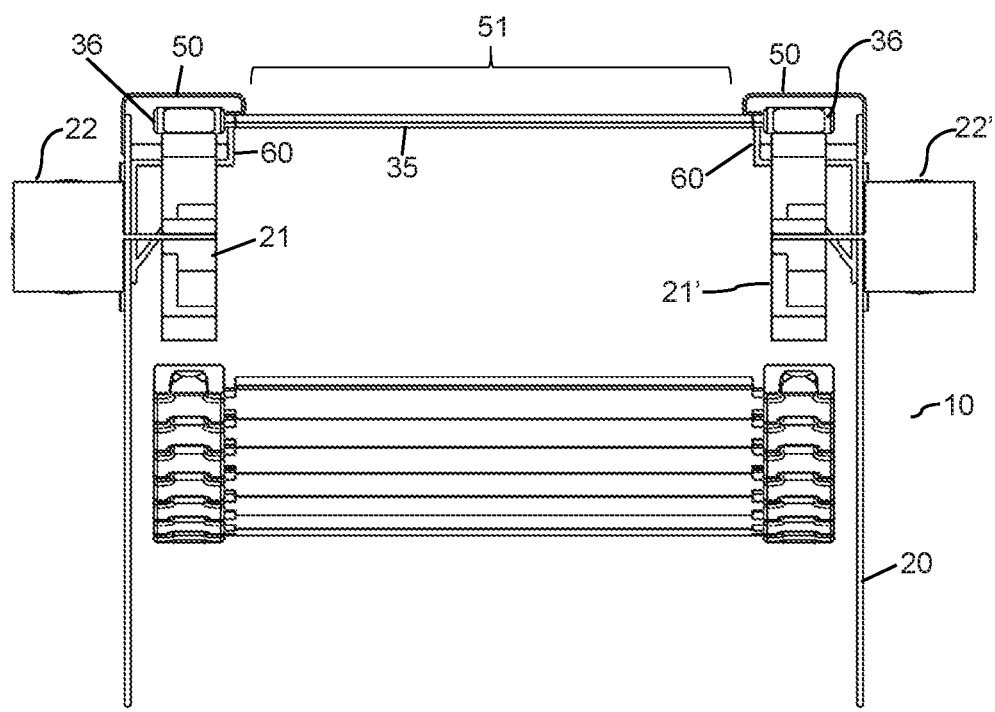
FIG. 6 is a cross-sectional front view of the conveyor of FIG. 1.
Figure 7:
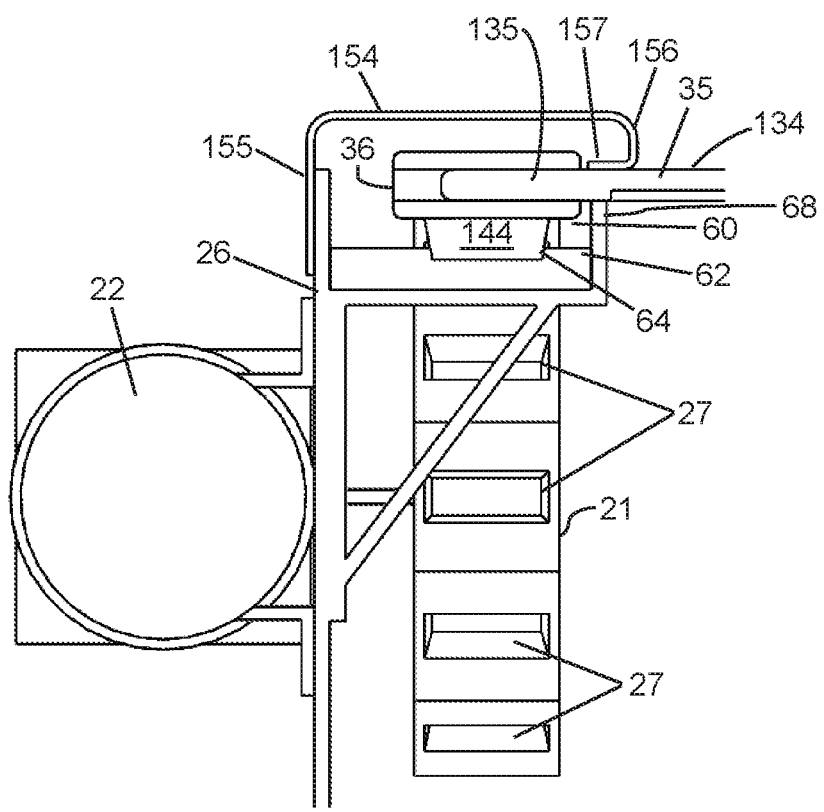
FIG. 7 is a detailed front view of the sprocket, track and drive portion of the slat conveyor belt of the conveyor of FIG. 1.

Referring to FIGS. 6 and 7, when assembled, the dust covers 50 of the conveyor 10 protect the product-contacting area 51 formed by the main bodies of the slat portions 35 from dust-generating components, such as the motors 22, 22', sprockets 21, 21' and drive modules 36. The frame 20 forms a track 60 on each side of the carryway for receiving the drive module portions 36. The dust cover 50 sits atop the track 60.

The illustrative dust cover 50 comprises an elongated body having a front surface 152 (shown in FIG. 1) that extends over and sits flush against a front wall 25 of the frame 20. A corresponding rear surface extends over and sits flush against a rear wall of the frame 20. A top surface 154 extends longitudinally above the track 60 from the front surface 152 to the rear surface. An outer side wall 155 extends down from the top surface 154 and overlaps an outer side wall 26 of the frame. An inner side wall 156 extends down from the top surface 154 and terminates in an inwards-facing tab 157 that extends towards the drive modules 36 and sits atop the slat upper surface 134. In the carryway of the conveyor, the connecting tabs 135 extends between the inwards-facing tab 157 and the inner wall 68 of the track 60 and into the drive module 36 seated in the track 60. Thus, the product-contacting surface 51 is separated from potentially unhygienic areas of the conveyor 10. In addition, the dust cover protects the product-contacting area of the conveyor from abrading components that can generate splinters or dust.

The track 60 for receiving the drive module portions may include a wear strip 62 providing a low-friction surface facilitating travel of the drive module portions 36 along the track. The wear strip 62 may include a notch 64 for seating the drive tooth 144 to track the conveyor belt 30.

FIG. 7 also shows a drive sprocket 21 at the end of the carryway for engaging and driving the drive modules on one side of the conveyor. The illustrative sprocket 21 includes drive pockets 27 for receiving the drive teeth 144 and is driven by a motor 22. The motor 22 is synchronized with the motor 22' on the other side of the conveyor (shown in FIG. 6) to push the engaged drive modules at the same speed, driving the conveyor belt 30 through the endless loop.

The conveyor belt modules 31 can be easily assembled and disassembled without tools, bolts or other potentially dirty components. In one embodiment, the track 60 is configured to automatically separate a slat portion 35 from an associated drive portion 36 to allow access, cleaning, removal or replacement of the slat portion without disassembling the drive chain or without removing any of the modules from the frame.

Figure 8A:
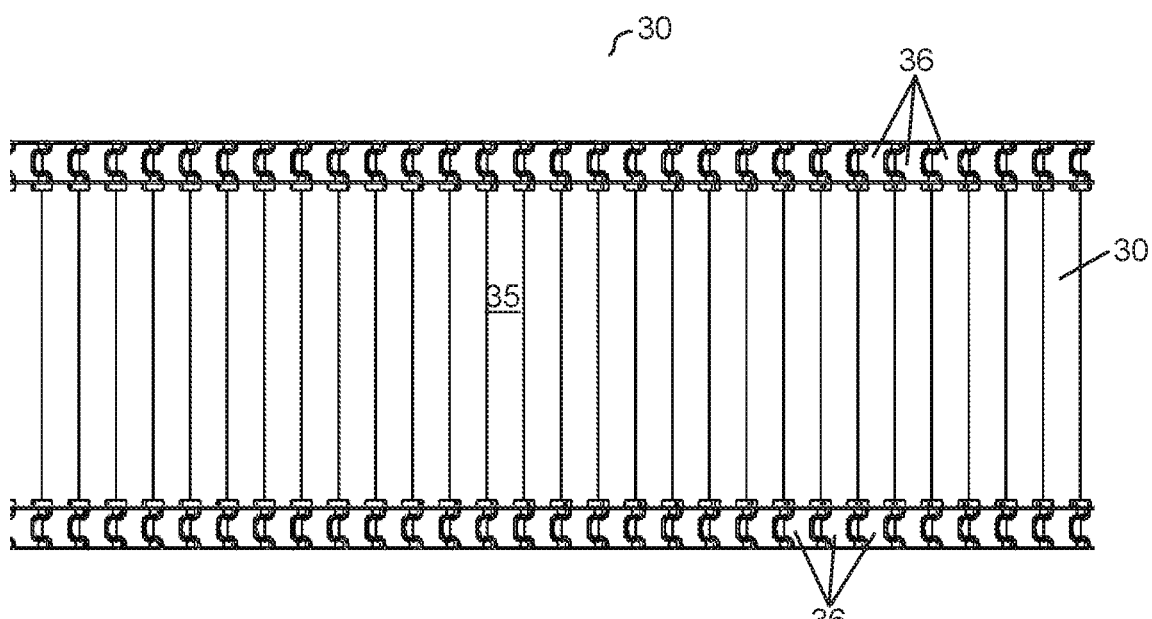
FIG. 8A is a top view of the slat conveyor belt of FIG. 1 in a straight, operating mode.
Figure 8B:
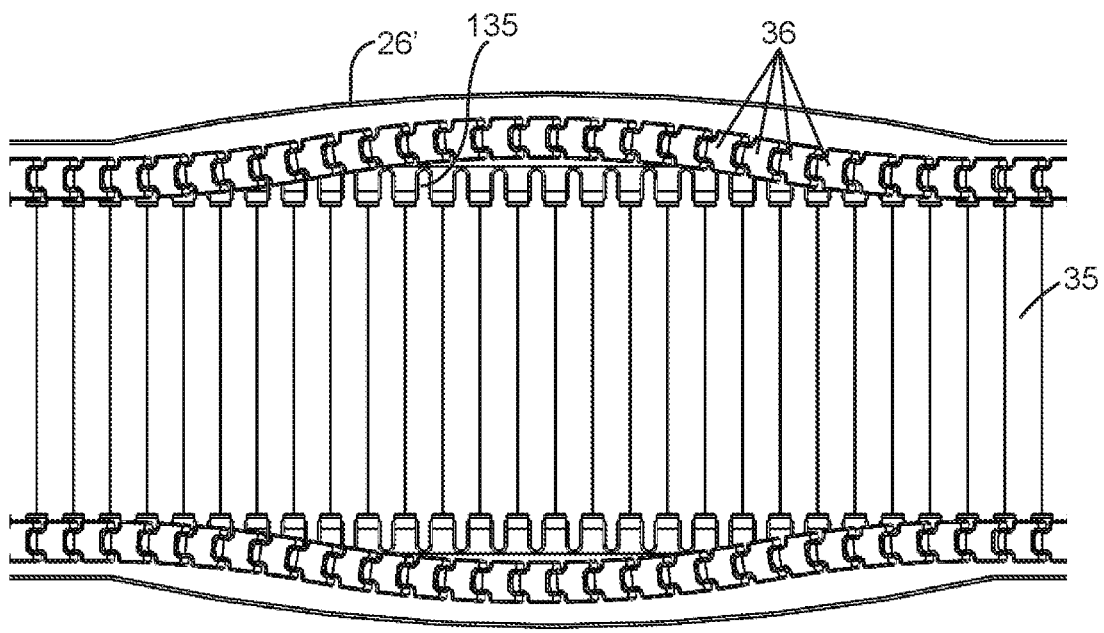
FIG. 8B is a top view of the slat conveyor belt of FIG. 8A in a separating mode.
Figure 9:
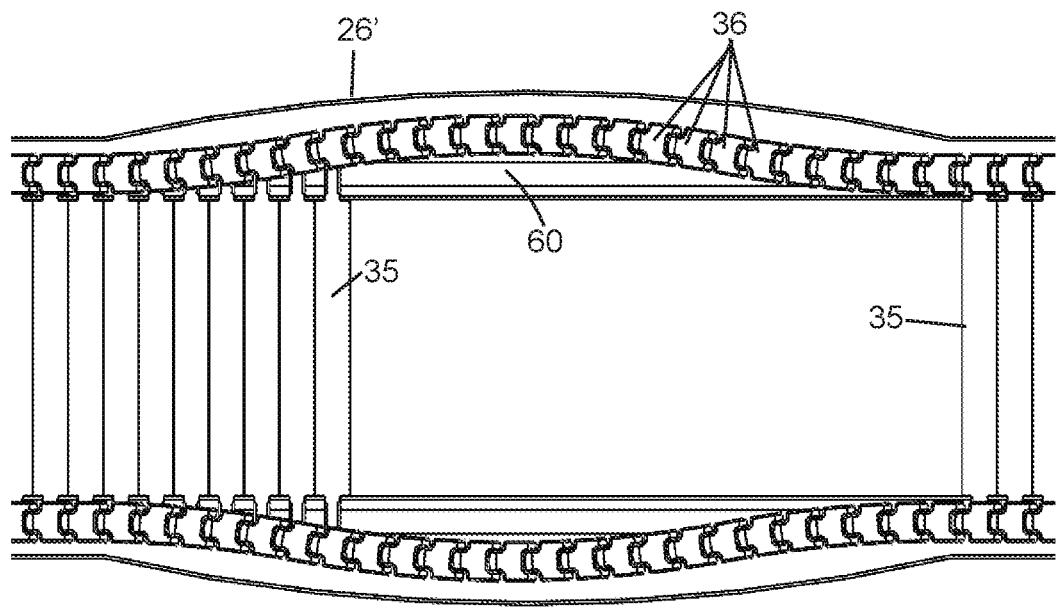
FIG. 9 is a top view of the slat conveyor belt of FIG. 8A during disassembly.

Referring to FIGS. 8A and 8B, in an operating mode, shown in FIG. 8A, the track 60 maintains the connection between the drive modules 36 and slat portions 35. In this mode, the connecting tabs 135 are inserted in the drive module recess 142 and held in place by the track 60, so that the movement transmitted to the drive modules 36 from the motors 22, 22' and sprockets 21 and 21' transmits to and moves the slat portions 35 through the endless loop. In one embodiment, shown in FIG. 8B, the frame is designed to allow selective separation of one or more of the drive chain modules 36 from an associated slat portion 35, to facilitate cleaning, removal, replacement, insertion or access to one or more of the slat portions. In one or more selective areas, the conveyor frame can include a curved outer wall 26' and a chain separator, an embodiment of which is described in detail below, for steering a drive module 36 out of engagement with an associated connecting tab 135 to separate the slat portion 35 from the drive portion 36. The illustrative drive modules 36 are capable of turning relative to each other, forming a curve while maintaining a hinged connection, to separate the slat portion 35, which does not curve, from the curved driving modules 36. As shown in FIG. 9, one or more slat portions 31 can then be removed from the conveyor belt 30 for cleaning, replacement and—or repair.

Figure 10A:
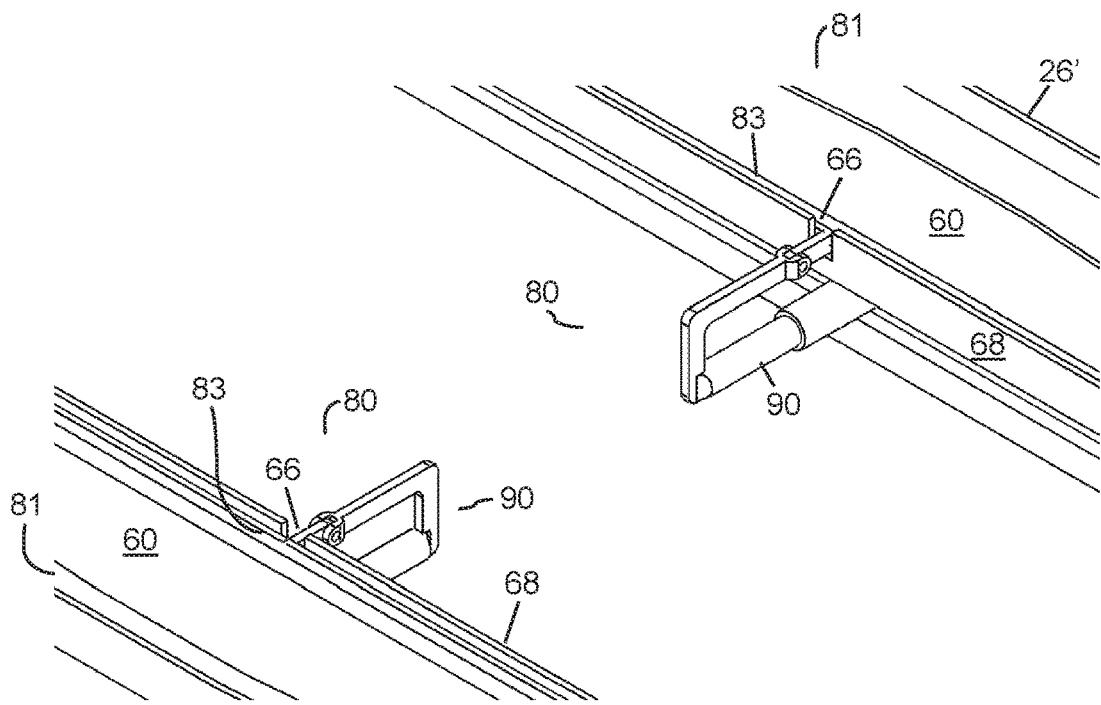
FIG. 10A is an isometric view the interior of the conveyor frame, showing a module separator during an inactive mode, allowing straight operation of the conveyor belt.
Figure 10B:
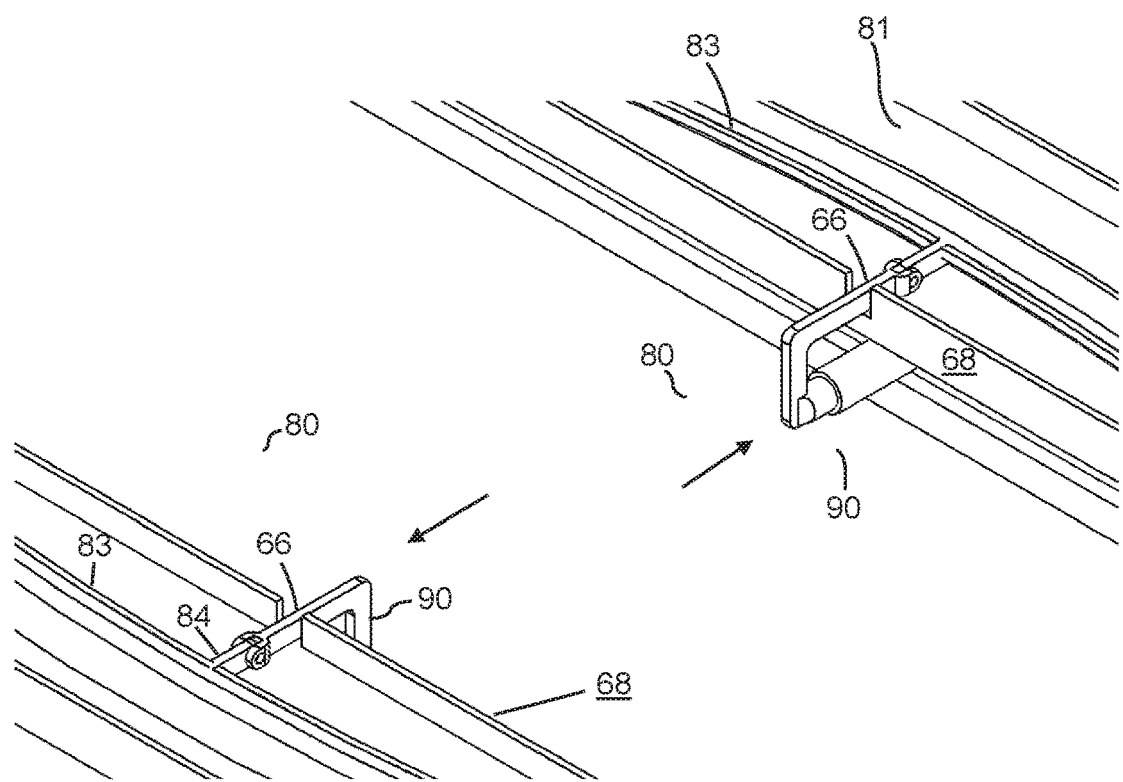
FIG. 10B is an isometric view the interior of the conveyor frame, showing the module separator in the separating mode.
Figure 11:
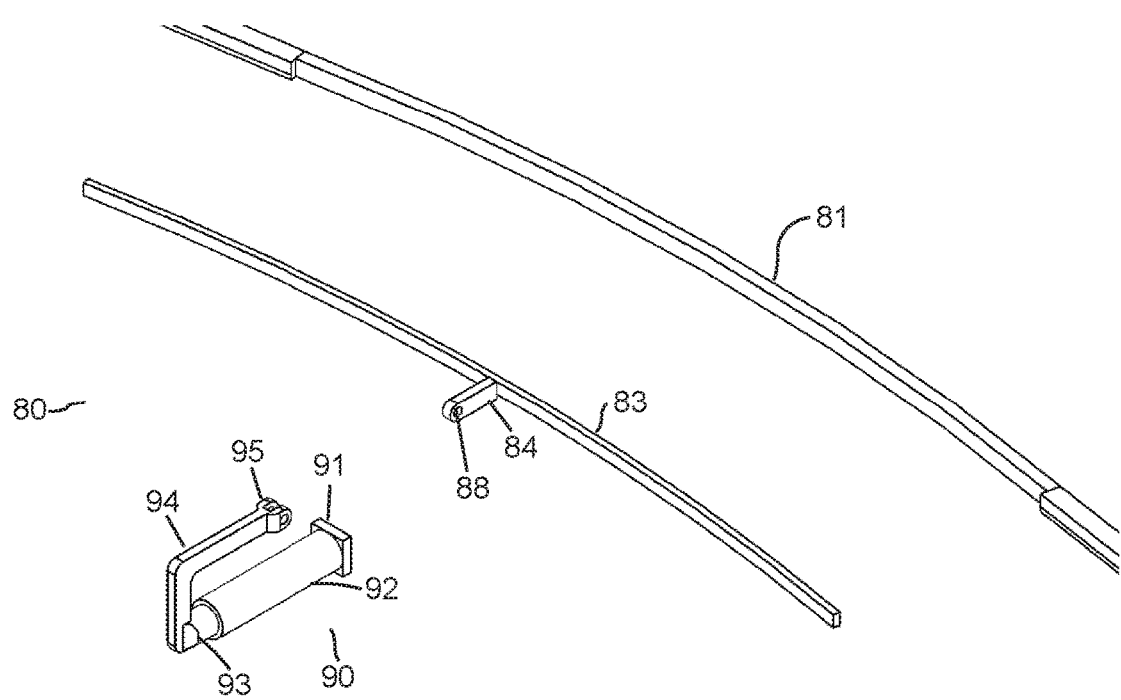
FIG. 11 is an exploded view of the module separator of FIGS. 10A and 10B.
Figure 12A:
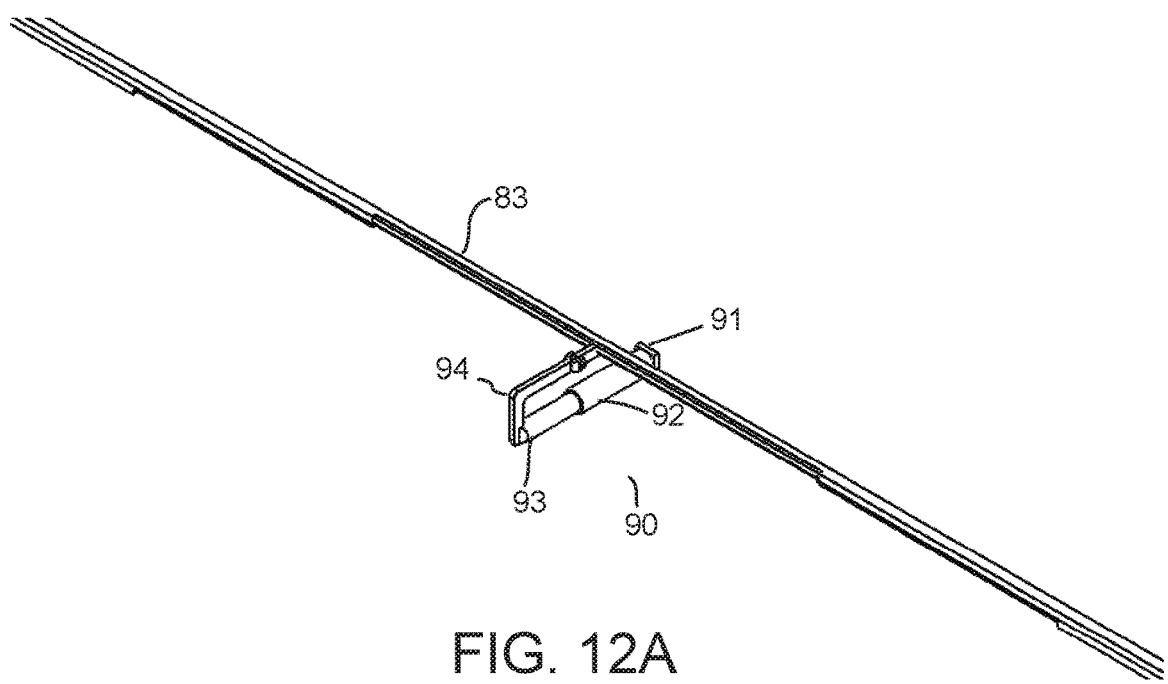
FIG. 12A is an isometric view of the module separator of FIG. 11 in the inactive mode.
Figure 12B:
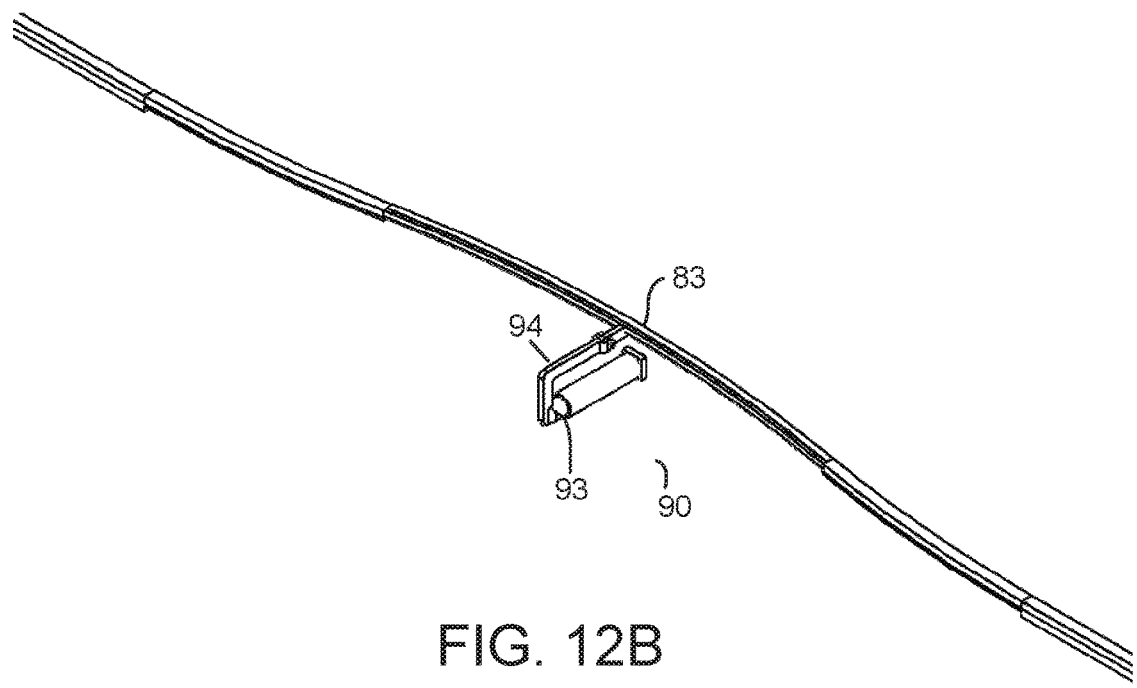
FIG. 12B is an isometric view of the module separator in a separation mode.
Figure 13A:
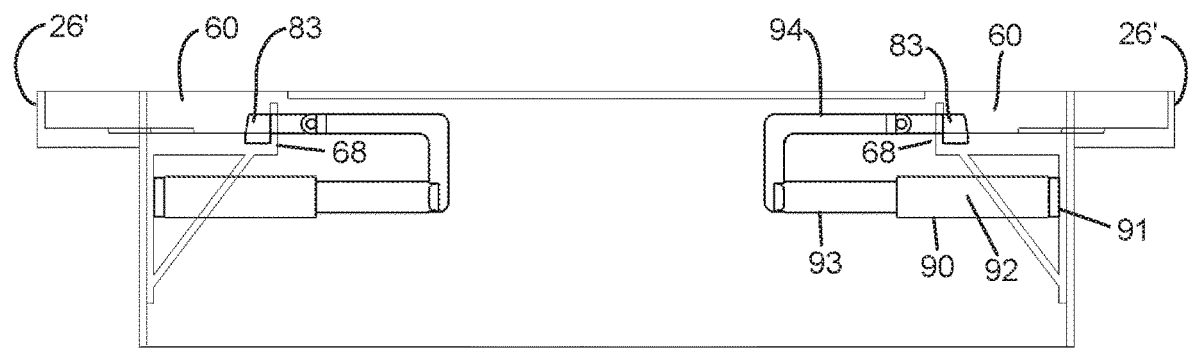
FIG. 13A is a cross-sectional front view of the conveyor in an operating mode.
Figure 13B:
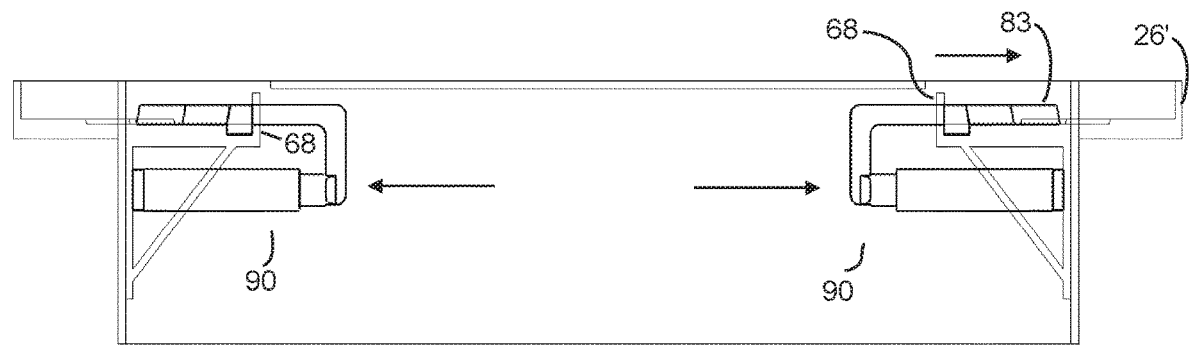
FIG. 13B is a cross-sectional front view of the conveyor in a separation mode.

Referring to FIGS. 10A-13B, the conveyor frame 20 may include a chain separator for selectively separating on or both sides of a slat portion 35 from an associated drive module 36. FIG. 11 is an exploded view of the chain separator 80. FIG. 10A shows the separator 80 in an operating mode, and FIG. 10B shows the separator in an actuated mode. The separator includes a curved side wear strip 81, a pusher 83 and an actuator 90. The track 60 has a curved outside wall in the area of the chain separator to accommodate the curved wear strip 81 and an opening 66 in the track inner wall 68 in the area of the chain separator to connect the actuator 90 to the pusher 83. The illustrative pusher 83 comprises a flexible metal sheet, such as a steel spring, having a connecting arm 84. FIGS. 12A and 13A show the chain separator 80 in an operating mode, wherein the slat portion and drive portion are connected. FIGS. 12B and 13B shows the chain separator 80 in a separating mode, wherein the chain separator separates one or both sides of the slat portion from the drive portion.

The illustrative actuator 90 is a linear actuator and includes a base 91 for mounting the linear actuator to the frame, a housing 92 and a telescoping rod 93 that can be selectively extended from and retracted into the housing. An L-shaped connecting arm 94 extends above and parallel to the base and terminates in spaced apart hinge elements 95 configured to receive the connecting arm 84 of the pusher. The connecting arm 84 has an opening 88 configured to align with the openings in the hinge elements 95. A rod or other fastener is inserted in the aligned opening to connect the connecting arm to the actuator 90.

In an operating mode, shown in FIGS. 8A, 10A, 12A, and 13A, the track 60 keeps the slat portion 35 connected to the drive modules 36 so the drive modules move in a straight path through the track, conveying product from the infeed to the outfeed. In this mode, the actuator 90 is in an extended position, with the telescoping rod 93 extending from the base 92, so that the connecting arm 94 pulls the pusher 83 against the inner wall of the track 60.

In a separating mode, shown in FIGS. 8B, 10B, 12B and 13B, the actuator 90 retracts the telescoping rod 93, which moves the pusher 83 away from the track inner wall 68 towards the outer side of the conveyor frame. The pusher 83 pushes the side of the drive teeth 144 to direct the drive modules away from the slat portions, while the curved side wear strip 81 and curved outer wall 26" accommodate the separated drive modules. The drive modules can be configured to allow the side flexing of the chain, such as, for example, by having an elongated rear hinge opening.

Figure 14:
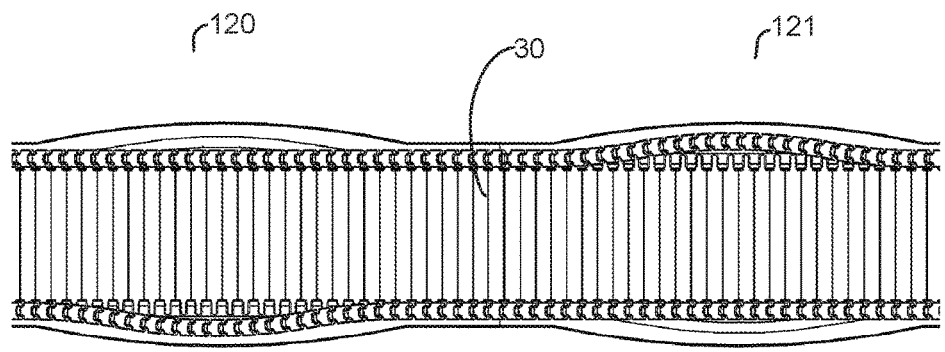
FIG. 14 is a top view of a conveyor configured to allow staggered cleaning of the slat conveyor belt according to an embodiment of the invention
Figure 15:
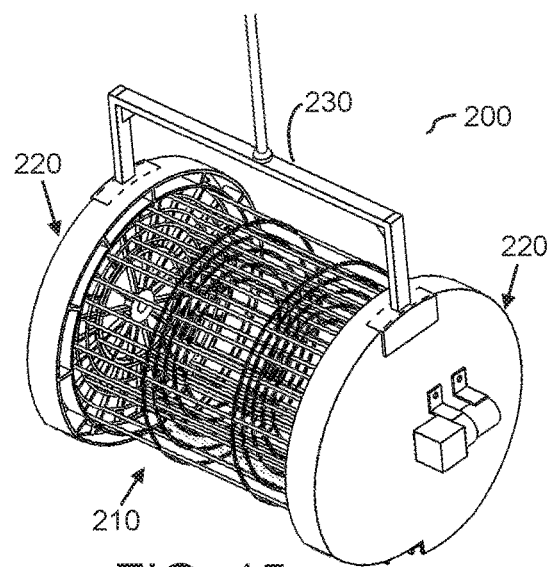
FIG. 15 is an isometric view of a magazine for removing and storing slats from a slat conveyor belt according to an embodiment.
Figure 16:
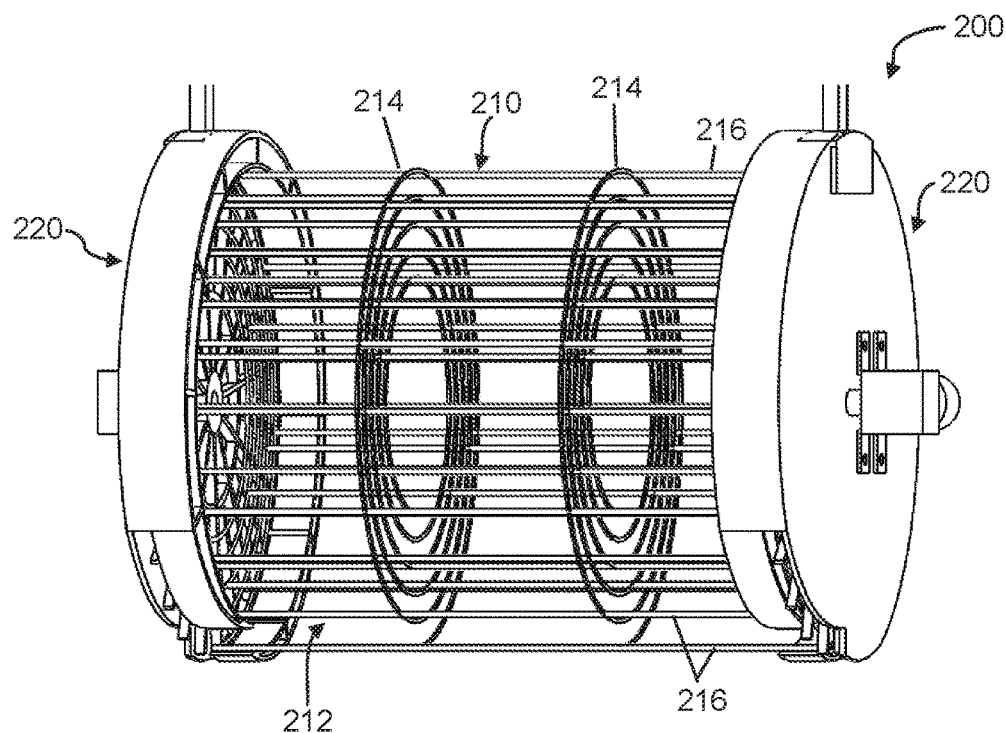
FIG. 16 is another view of the magazine of FIG. 15.
Figure 17:
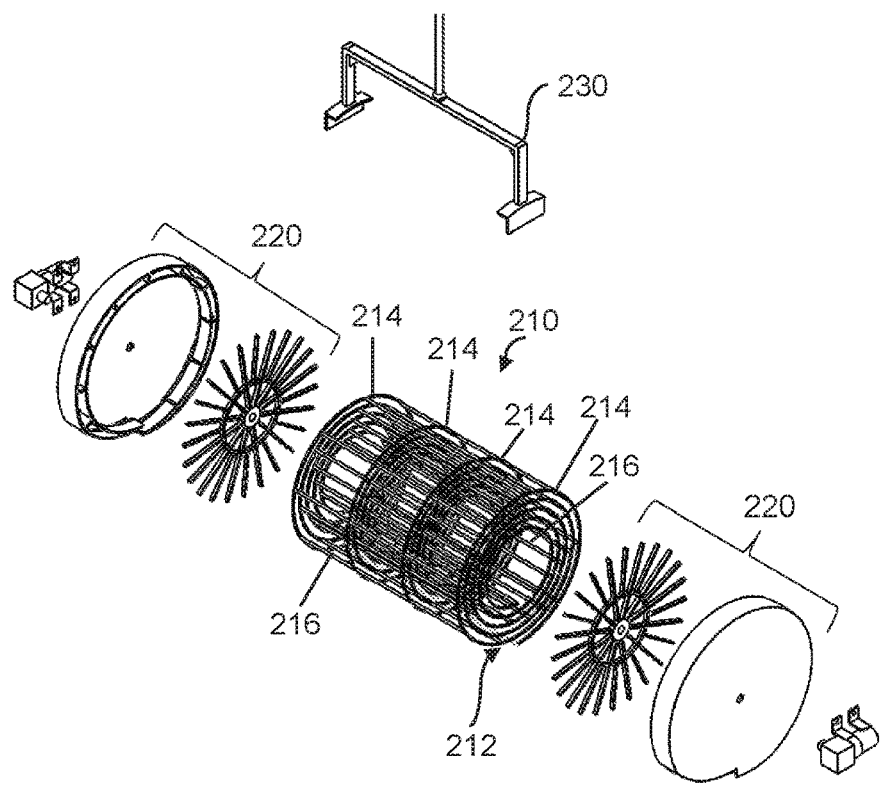
FIG. 17 is an exploded view of the magazine of FIG. 15.

As shown in FIG. 14, the conveyor frame can be designed to allow staggered cleaning. For example, in a first section 120, a first side of the conveyor belt 30 disengages to dean the slats, while the second side remains engaged. In a second section 121, the second side of the conveyor belt disengages, while the first side remains engaged.

The capability of the illustrative slat conveyor belt to separate can be exploited to automate removal and replacement of the slats for deep cleaning. For example, after manually removing one or a couple of slats 35, a magazine or other suitable device can be situated between the widened drive modules 36 and in front of the remaining belt slats.

FIGS. 15-21D show an embodiment of a magazine for removing and storing separated slats in a slat conveyor belt. The illustrative magazine 200 comprises a helical wound basket 210 for receiving and storing slats, slat drive units 220 coupled to and supporting each end of the helical wound basket 210 and a yoke 230 for mounting the magazine above a slat conveyor belt. The illustrative helical wound basket 210 is a substantially cylindrical structure defining a helical path for the slats and having an entrance opening 212. The helical path is formed by a series of spiral coils 214 connected by lateral support bars 216, but the invention is not so limited. The slat drive units 220 push successive, separated slats into the basket 210.

Figure 18:
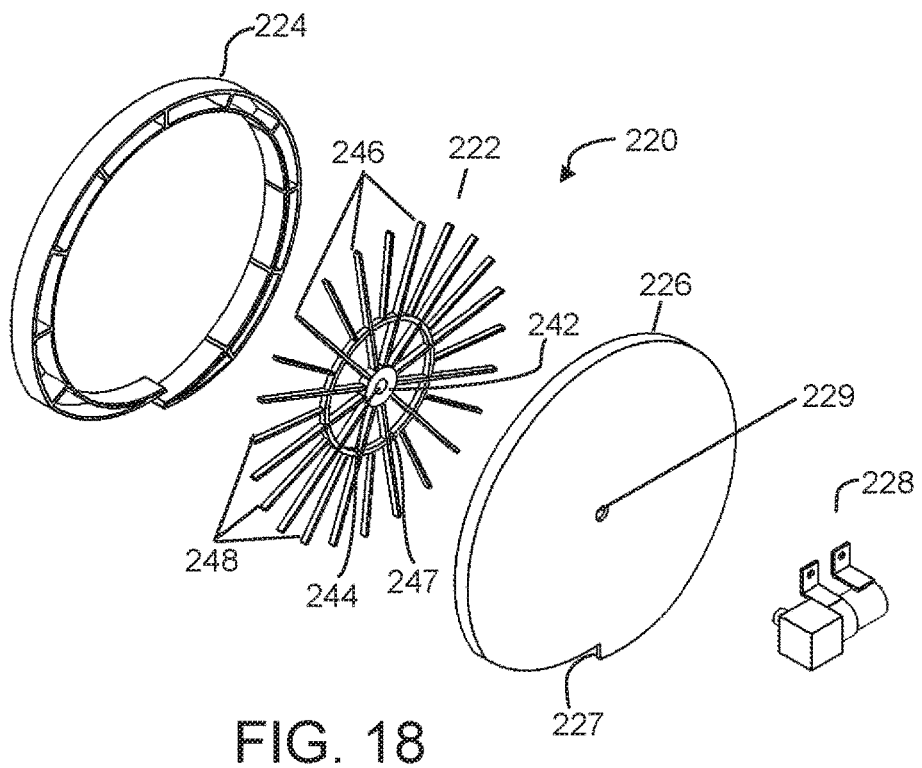
FIG. 18 is an exploded view of the slat drive unit in the magazine of FIG. 15.

As shown in FIG. 18, each slat drive unit 220 comprises a slat pusher 222, an end frame 224 for supporting the end of the basket 210, an end cover 226 and a gearmotor 228. The end frame 224 comprises a single loop of a spiral and receives an outer spiral coil 214 of the basket. The slat pusher 222 is housed between the end cover 226 and the end frame 224 and comprises a hub 242 with a central opening 244, a plurality of primary spokes 246 radiating from the hub, an intermediate support ring 247 and a plurality of secondary spokes 248 radiating from the intermediate support ring. The end cover 226 has a profile that matches the shape of the end frame 224, forming a vertical wall 227 at the entrance opening 212, and includes a central opening 229 for receiving the output shaft of the gearmotor 228. When the magazine 200 is assembled, the gearmotor 228 rotates the slat pusher 222 to induct or discharge slats into or from the magazine, as described below.

Figure 19:
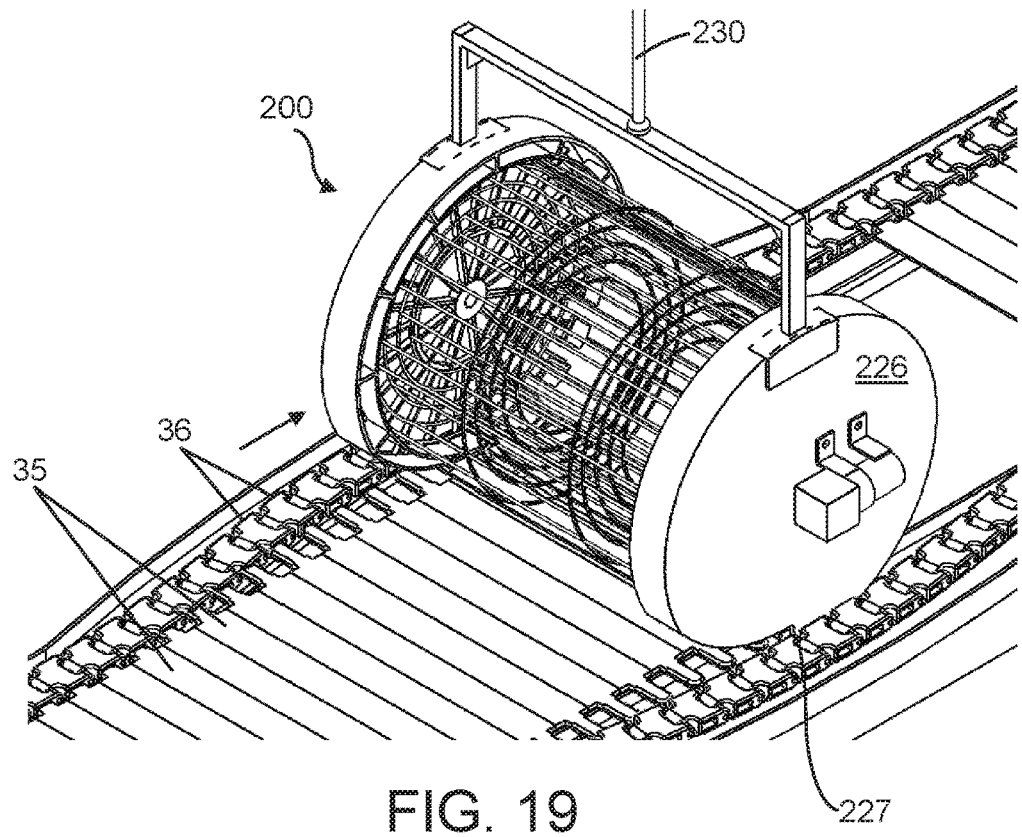
FIG. 19 is an isometric top view of the magazine of FIG. 15 removing separated slats from a slat conveyor belt.
Figure 20:
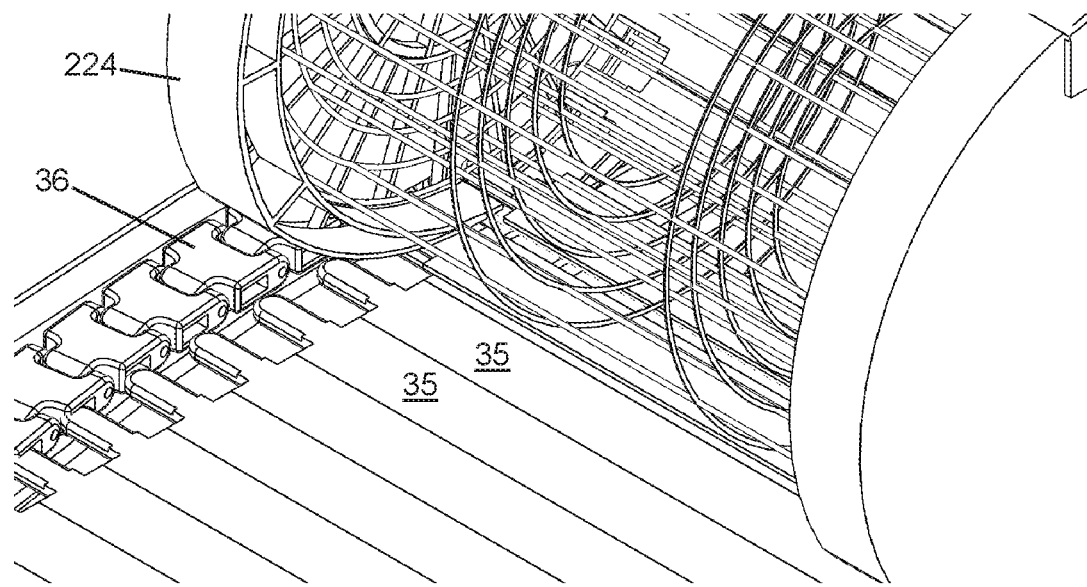
FIG. 20 is a detailed view of the slate removal of FIG. 19.
Figure 21A:
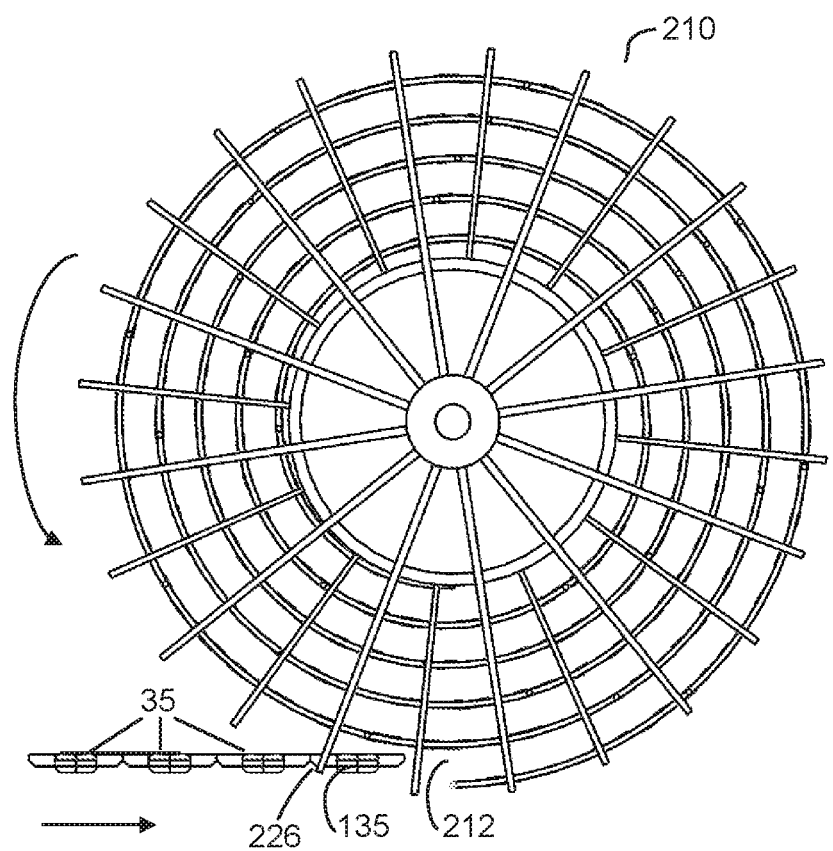
FIGS. 21A-21D are side views of the magazine of FIG. 15 during slat removal.
Figure 21B:
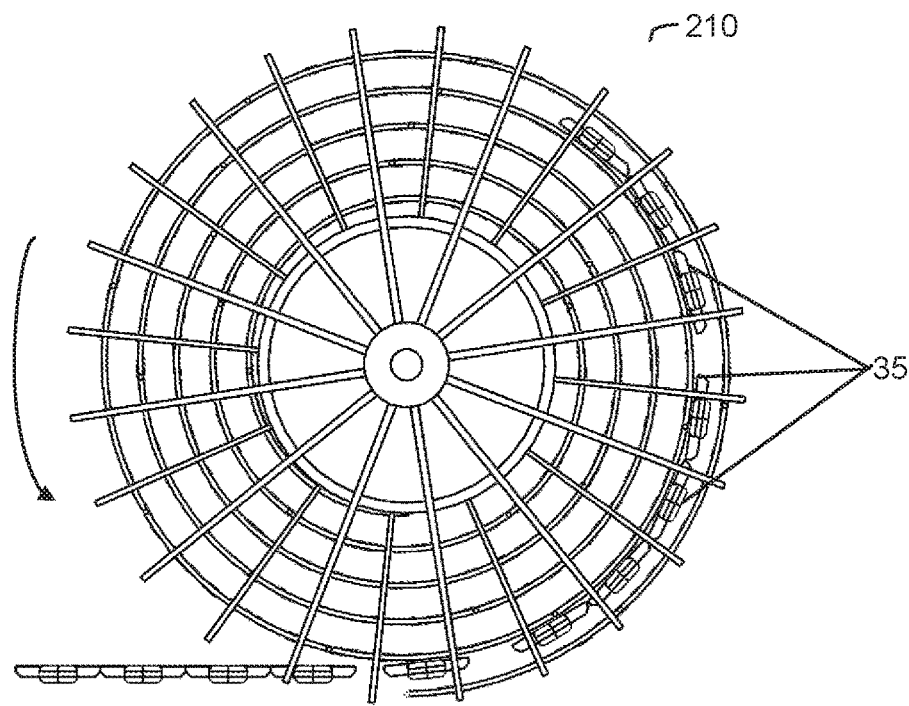
Figure 21C:
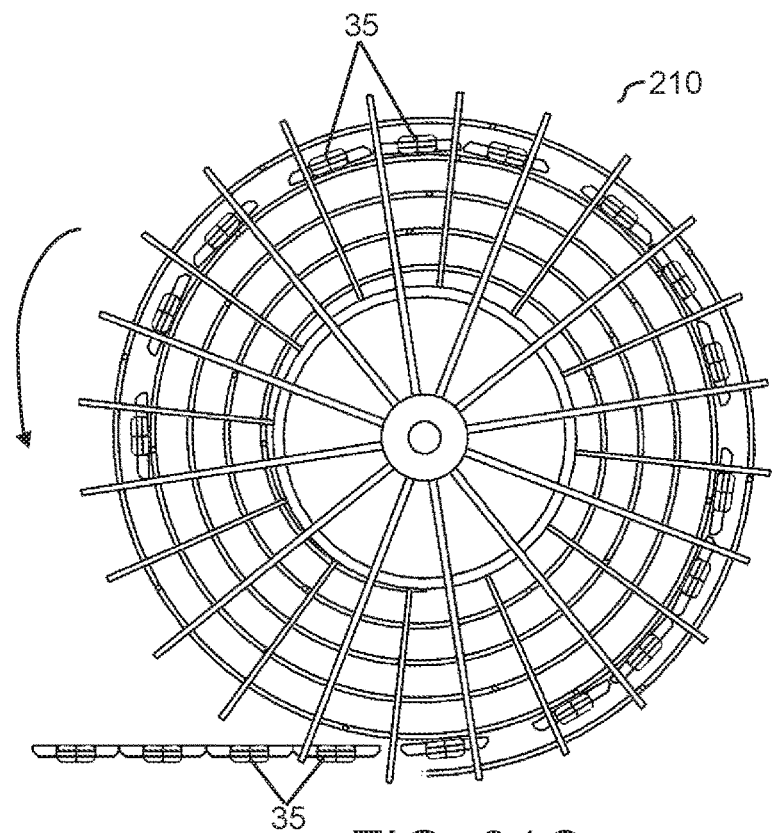
Figure 21D:
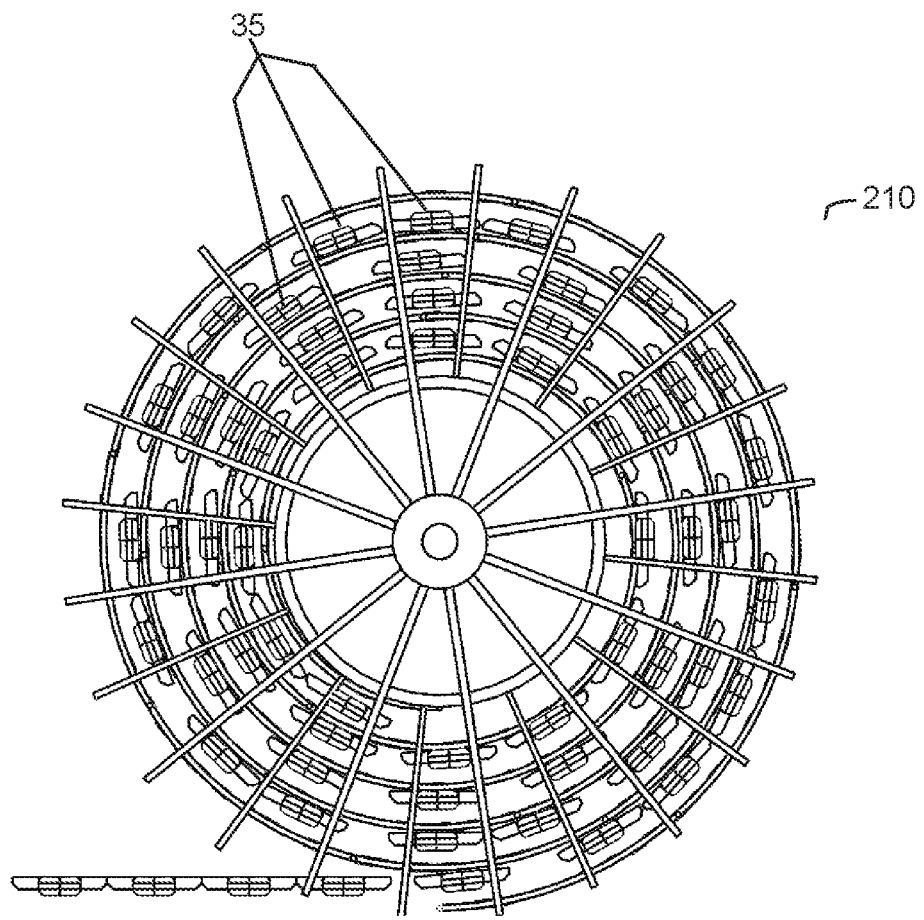

Referring to FIGS. 19 and 20, to automatically remove separated slats 35 from a conveyor using the magazine 200, the magazine 200 is placed into position above the conveyor belt at the separation region using the yoke 230. The magazine 200 is positioned so that the vertical walls 227 extend between the drive modules 36 and separated slats 35, with a spoke 246 or 248 behind the connecting tab 135 of a slat 35, as shown in FIG. 21A. The gearmotor 228 rotates the slat pusher 222 at a selected pace, while the conveyor belt 30 runs in synchronization with the slat pusher to push slats through the entrance opening 212 and into the basket 210. As the conveyor belt runs, the upstream slats push the successive slats into the magazine spokes. FIGS. 21A-21D show the magazine 200 as it is loaded with slats removed from a conveyor belt. In FIG. 21A, the slats 35 first enter the magazine basket 210. In FIG. 21B, the slats 35 begin filling the basket 210. FIG. 21C shows the slats 35 filling nearly one rotation of the basket 210. FIG. 21D shows the basket 210 nearly full of removed slats. The slats 35 loaded into the spiral basket 210 can then be transported to a deep cleaning station. A conveyor belt with removable slats can be assembled or reassembled using a reverse procedure, with successive slats inserted between separated and spaced apart drive modules and the drive modules pushed into engagement with the slat.

Although the invention has been described in detail with reference to a few exemplary versions, other versions are possible. The scope of the claims is not meant to be limited to the versions described in detail.

What is claimed is:

1. A conveyor belt module comprising:
    a slat comprising a body having a top conveying surface extending from a front edge to a rear edge, and from a first side to a second side, the slat further comprising a connecting tab extending from the first side, wherein the connecting tab is coplanar with the body; and
    a drive module coupled to the slat for driving the slat through an endless loop, the drive module comprising a body, an opening in a side of the body for receiving the connecting tab and a drive element for driving the module through an endless loop.

2. The conveyor belt module of claim 1, wherein the slat comprises a second connecting tab extending from the second side of the slat body, and the module further comprises a second drive module having an opening for receiving the second connecting tab.

3. The conveyor belt module of claim 1, wherein the connecting tab has a rounded outer edge.

4. The conveyor belt module of claim 1, wherein the drive element comprises a tooth for engaging a drive pocket in a sprocket.

5. The conveyor belt module of claim 1, wherein the drive module includes front and rear hinge elements for connecting the drive module to front and rear drive modules in the endless loop.

6. The conveyor belt module of claim 1, wherein the slat is reversible about either a central lateral axis or a central vertical axis.

7. A conveyor comprising:
    a frame;
    a slat conveyor belt supported in the frame, the slat conveyor belt comprising a series of rows of slats coupled to drive modules, each slat including a connecting tab received in a side opening in an associated drive module; and,
    a separator for selectively separating a slat from a drive module without removing the drive module from the frame.

8. The conveyor of claim 7, wherein the frame includes a track extending from a first end to a second end for housing the drive modules.

9. The conveyor of claim 8, further comprising a dust cover covering the track.

10. The conveyor of claim 9, wherein the dust cover comprises a longitudinally-extending top surface, an outer side wall extending down from the top surface and overlapping an outer side wall of the frame, an inner side wall extending down from the top surface and terminates in an inwards-facing tab that extends towards the drive modules and sits atop the slat upper surface.

11. The conveyor of claim 10, wherein the connecting tabs extend between the inwards-facing tab and an inner wall of the track.

12. The conveyor of claim 8, further comprising a wear strip in the track having a longitudinal notch for receiving drive teeth of the drive modules to track the slat conveyor belt.

13. The conveyor of claim 7, wherein the drive modules are capable of forming a curve to separate selected drive modules from associated slats.

14. The conveyor of claim 11, wherein the separator comprises an actuator and a pusher adjacent a section the track for selectively pushing a drive module into a curve and out of connection with an associated slat.

15. The conveyor of claim 7, further comprising a magazine for automatically removing and storing separated slats.

16. The conveyor of claim 7, further comprising a pair of synchronized motors, each driving a sprocket disposed adjacent to a side edge of the slat conveyor belt for engaging and driving a chain of drive modules without contacting the slats.

17. A conveyor frame for a slat conveyor belt, comprising:
    a track extending from an infeed end to an outfeed end adjacent a carryway, the track including a curved outer wall in a separating portion;
    a wear strip for a drive chain on a bottom wall of the track;
    a curved side wear strip along the separating portion of the track;
    a pusher adjacent an inner wall of the track in the separating portion; and
    an actuator for pushing a drive module out of engagement with a slat of the slat conveyor belt.

18. The conveyor frame of claim 16, further comprising a magazine for automatically removing and storing slats separated from associated drive modules.

19. The conveyor frame of claim 17, wherein the conveyor frame has a first section having a first curved side wear strip; a first pusher and a first actuator for disengaging a first side of the conveyor belt, while the second side remains engaged and a second section having a second curved side wear strip, a second pusher and a second actuator for disengaging a second side of the conveyor belt while the first side remains engaged.

20. A conveyor belt module comprising:
    a slat comprising a body having a top conveying surface extending from a front edge to a rear edge, and from a first side to a second side, the slat further comprising a connecting tab extending from the first side; and
    a drive module coupled to the slat for driving the slat through an endless loop, the drive module comprising a body, an opening in a side of the body for receiving the connecting tab and a tooth for engaging a drive pocket in a sprocket to drive the module through an endless loop.

21. A conveyor comprising:

a frame including a track extending from a first end to a second end and a wear strip in the track having a longitudinal notch; and a slat conveyor belt supported in the frame, the slat conveyor belt comprising a series of rows of slats coupled to drive modules, each slat including a connecting tab received in a side opening in an associated drive module, wherein each drive module is housed in the track and includes a drive tooth received in the longitudinal notch for tracking the slat conveyor belt.

22. A conveyor comprising:

a frame having a track extending from a first end to a second end;

a slat conveyor belt supported in the frame, the slat conveyor belt comprising a series of rows of slats coupled to drive modules housed in the track, each slat including a connecting tab received in a side opening in an associated drive module; and a dust cover covering the track wherein the dust cover comprises a longitudinally-extending top surface, an outer side wall extending down from the top surface and overlapping an outer side wall of the frame, an inner side wall extending down from the top surface and terminates in an inwards-facing tab that extends towards the drive modules and sits atop the slat upper surface.

* * * * *